(12) United States Patent
Bai et al.

(10) Patent No.: US 12,294,686 B2
(45) Date of Patent: May 6, 2025

(54) NON-BLIND-AREA MULTI-VIEW PANORAMIC STEREO IMAGING DEVICE (71) Applicant: ZHEJIANG UNIVERSITY, Zhejiang (CN)

(72) Inventors: Jian Bai, Zhejiang (CN); Jia Wang, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 18/282,944

(22) PCT Filed: Sep. 13, 2022

(86) PCT No.: PCT/CN2022/118305
§ 371 (c)(1),
(2) Date: Sep. 19, 2023

(87) PCT Pub. No.: WO2023/103500
PCT Pub. Date: Jun. 15, 2023

(65) Prior Publication Data
US 2024/0171720 A1 May 23, 2024

(30) Foreign Application Priority Data
Dec. 8, 2021 (CN) .......................... 202111488007.9

(51) Int. Cl.
H04N 13/218 (2018.01)
H04N 13/00 (2018.01)
H04N 13/229 (2018.01)

(52) U.S. Cl.
CPC ......... *H04N 13/218* (2018.05); *H04N 13/229* (2018.05); *H04N 2013/0088* (2013.01)

(58) Field of Classification Search
CPC ............... H04N 13/218; H04N 13/229; H04N 2013/0088
(Continued)

(56) References Cited

U.S. PATENT DOCUMENTS 5,473,474 A 12/1995 Powell
7,038,846 B2 * 5/2006 Mandella ............... G02B 13/06
359/708
(Continued)

FOREIGN PATENT DOCUMENTS

CN 102401988 4/2012
CN 102401988 A * 4/2012
(Continued)

OTHER PUBLICATIONS

Machine translation of CN 102508354 A (Year: 2012).*
(Continued)

*Primary Examiner* — Christopher S Kelley
*Assistant Examiner* — Ana Picon-Feliciano
(74) *Attorney, Agent, or Firm* — Whiteford, Taylor & Preston, LLP; Peter J. Davis (57) ABSTRACT Disclosed is a non-blind-area multi-view panoramic stereo imaging device. The device comprises a front lens assembly or a plane mirror, an aspheric mirror, a middle lens assembly, a panoramic block, a rear lens assembly and an image surface which are longitudinally arranged along an optical axis. The aspheric mirror comprises a central hole and an annular reflecting surface. The panoramic block comprises a front central circular transmission surface, a front reflecting surface, a front transmission surface, a rear reflecting surface and a rear transmission surface. The front reflecting surface, the front transmission surface and the rear reflecting surface are all annular surfaces. The inner edge of the front reflecting surface is connected with the edge of the front central circular transmission surface.

2 Claims, 5 Drawing Sheets (58) Field of Classification Search
USPC .......................................................... 348/49
See application file for complete search history.

(56) References Cited

U.S. PATENT DOCUMENTS

| | | | | |
|---|---|---|---|---|
| 7,612,946 B2* | 11/2009 | Kweon, II | ............. | G02B 13/08 |
| | | | | 359/650 |
| 8,259,164 B2* | 9/2012 | Saito | .................. | G02B 27/0172 |
| | | | | 348/54 |
| 2014/0340472 A1* | 11/2014 | Pern Echele | .......... | G02B 17/08 |
| | | | | 348/36 |
| 2021/0072518 A1* | 3/2021 | Giordano | ............... | H04N 23/55 |

FOREIGN PATENT DOCUMENTS

| | | | |
|---|---|---|---|
| CN | 102508354 | | 6/2012 |
| CN | 102508354 A | * | 6/2012 |
| CN | 104181675 | | 12/2014 |
| CN | 108181782 | | 6/2018 |
| CN | 111751964 | | 10/2020 |
| CN | 114185243 | | 3/2022 |

OTHER PUBLICATIONS

Machine translation of CN 102401988 A (Year: 2012).*
International Search Report issued in copending Chinese Patent Application No. PCT/CN2022/118305 on Nov. 30, 2022.
Acta Optica Sinica, "Depth Estimation With a Panoramic Stereo Imaging System", pp. 1-9, published Jun. 2013.

* cited by examiner

FIG. 5

NON-BLIND-AREA MULTI-VIEW PANORAMIC STEREO IMAGING DEVICE

CROSS-REFERENCE TO RELATED APPLICATION

This patent application is a national stage application of International Patent Application No. PCT/CN2022/118305, filed on Sep. 13, 2022, which claims the benefit and priority of Chinese Patent Application No. 202111488007.9 filed with the China National Intellectual Property Administration on Dec. 8, 2021 and entitled "NON-BLIND-AREA MULTI-VIEW PANORAMIC STEREO IMAGING DEVICE", the disclosure of which is incorporated by reference herein in its entirety as part of the present application.

TECHNICAL FIELD

The present disclosure relates to the technical field of panoramic imaging, in particular to a non-blind-area multi-view panoramic stereo imaging device.

BACKGROUND

The panoramic annular system has been applied in security monitoring, video conference, machine vision, endoscope and other fields because of the characteristics of large-FOV (Large-Field-Of-View) panoramic shooting, high real-time performance, high image quality and single detector imaging. Real-time gazing around the optical axis can be performed on 360-degree objects, but stereo imaging cannot be realized. The general stereo imaging system is often composed of a plurality of lenses and a plurality of detectors. Panoramic stereo images are obtained by rotating lenses, complex image mosaic algorithms and motion servo mechanisms are needed, and the reliability and real-time performance are low.

In the prior art, two coaxially placed panoramic annular systems are adopted to realize stereo information collection. Or, a panoramic block lens, an ordinary lens assembly and a plane mirror is used, so that two light paths can be imaged on the same image surface, respectively in the annular area and the central circular area, so that the dual functions of panoramic observation and telescopic observation are realized. However, the imaging system still has the defects of blind area and insufficient FOV (Field-Of-View).

SUMMARY

The present disclosure aims to provide a non-blind-area multi-view panoramic stereo imaging device to overcome the shortcomings of the existing panoramic multi-view imaging technology, such as insufficient overlapping area of shooting objects in the panoramic FOV and small surround-view FOV angle.

In order to achieve the purpose, the present disclosure provides the following scheme.

A non-blind-area multi-view panoramic stereo imaging device includes a front lens assembly or a plane mirror, an aspheric mirror, a middle lens assembly, a panoramic block, a rear lens assembly and an image surface which are longitudinally arranged along an optical axis.

The aspheric mirror includes a central hole and an annular reflecting surface which are arranged in the middle.

The panoramic block includes a front central circular transmission surface, a front reflecting surface, a front transmission surface, a rear reflecting surface and a rear transmission surface. The front central circular transmission surface is located at the front central position of the panoramic block, and the rear transmission surface is located at the rear central position of the panoramic block. The front reflecting surface, the front transmission surface and the rear reflecting surface are all annular surfaces. The inner edge of the front reflecting surface is connected with the edge of the front central transmission surface. The edge of the front transmission surface is respectively connected with the outer edge of the front reflecting surface and the outer edge of the rear reflecting surface. The inner edge of the rear reflecting surface is connected with the edge of the rear transmission surface.

The front reflecting surface in the panoramic block reflects a light path toward the image surface, and the rear reflecting surface reflects the light path away from the image surface, so that a large-FOV light ray is reflected by the two reflecting surfaces of the panoramic block, exits from the panoramic block at a small angle, enters the rear lens assembly, and is imaged on the image surface.

The curvature radius of the front central circular transmission surface is the same as that of the front reflecting surface, and is different from that of the front transmission surface. The curvature radii of the rear reflecting surface and the rear transmission surface are the same.

Preferably, the imaging device includes three light path channels. The first light path channel is configured to image a lateral field by using the panoramic block, and an image point P1 is located in an external annular area of a detection image surface. The second light path channel is configured to reflect light by the aspheric mirror and then image the lateral field by the front central circular transmission surface of the panoramic block, and an image point P2 is located in an internal annular area of a detection image surface. The third light path channel is configured to use the front lens assembly or the plane mirror to fold the light path. The light ray passes through the central hole of the coaxially placed aspheric mirror and the front central circular transmission surface of the panoramic block in turn, and finally reaches a central circular area for imaging. The external annular area of a detection image surface, the internal annular area of a detection image surface and the central circular area do not interfere with one another, so that non-blind-area large-FOV stereo imaging is realized.

Preferably, the curved surface of the aspheric mirror is a free-form surface, so that the edge can be folded in a large FOV, and the light ray conveniently enters the imaging device and reaches the image surface for imaging.

The non-blind-area multi-view panoramic stereo imaging device in the present disclosure utilizes the feature that both the aspheric mirror and the panoramic block lens can image a large-FOV object square area around the optical axis by 360°, and both the aspheric mirror and the panoramic block lens are combined for imaging, so that a large overlapping area is achieved in the two fields, and the detection of the spatial position coordinates of the same target object is facilitated. Next, on the basis of the combination of the aspheric mirror and the panoramic block lens, the front lens group or the plane mirror is added, and three channels are arranged longitudinally along the optical axis without moving components. Panoramic images can be obtained in real time, and is free of blind spots and simple in structure. Finally, three-view stereo imaging can be realized in real time, a single detector is used for observation, and the position of a spatial object point is calculated from different positions of the three image points, so that the detection accuracy is improved, and the system cost is reduced.

BRIEF DESCRIPTION OF THE DRAWINGS

To more clearly illustrate the embodiment of the present disclosure or the technical scheme in the prior art, the following briefly introduces the attached figures to be used in the embodiment. Apparently, the attached figures in the following description show merely some embodiments of the present disclosure, and those skilled in the art may still derive other drawings from these attached figures without creative efforts.

REFERENCE SIGNS

P, object point; P1, first image point; P2, second image point; P3, third image point; P4, fourth image point; 1, light ray; 2, light ray; 17, light ray; 20, light ray; 3, panoramic block; 4, rear lens assembly; 5, aspheric mirror; 6, middle lens assembly; 7, image surface; 8, annular reflecting surface; 9, front reflecting surface; 10, rear reflecting surface; 11, front reflecting surface; 12, rear transmission surface; 13, front central circular transmission surface; 14, internal annular area of detection image surface; 15, external annular area of detection image surface; 16, central circular area; 18, front lens assembly; 19, central hole of aspheric mirror; and 21, plane mirror.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

Embodiment I

Figure 1:
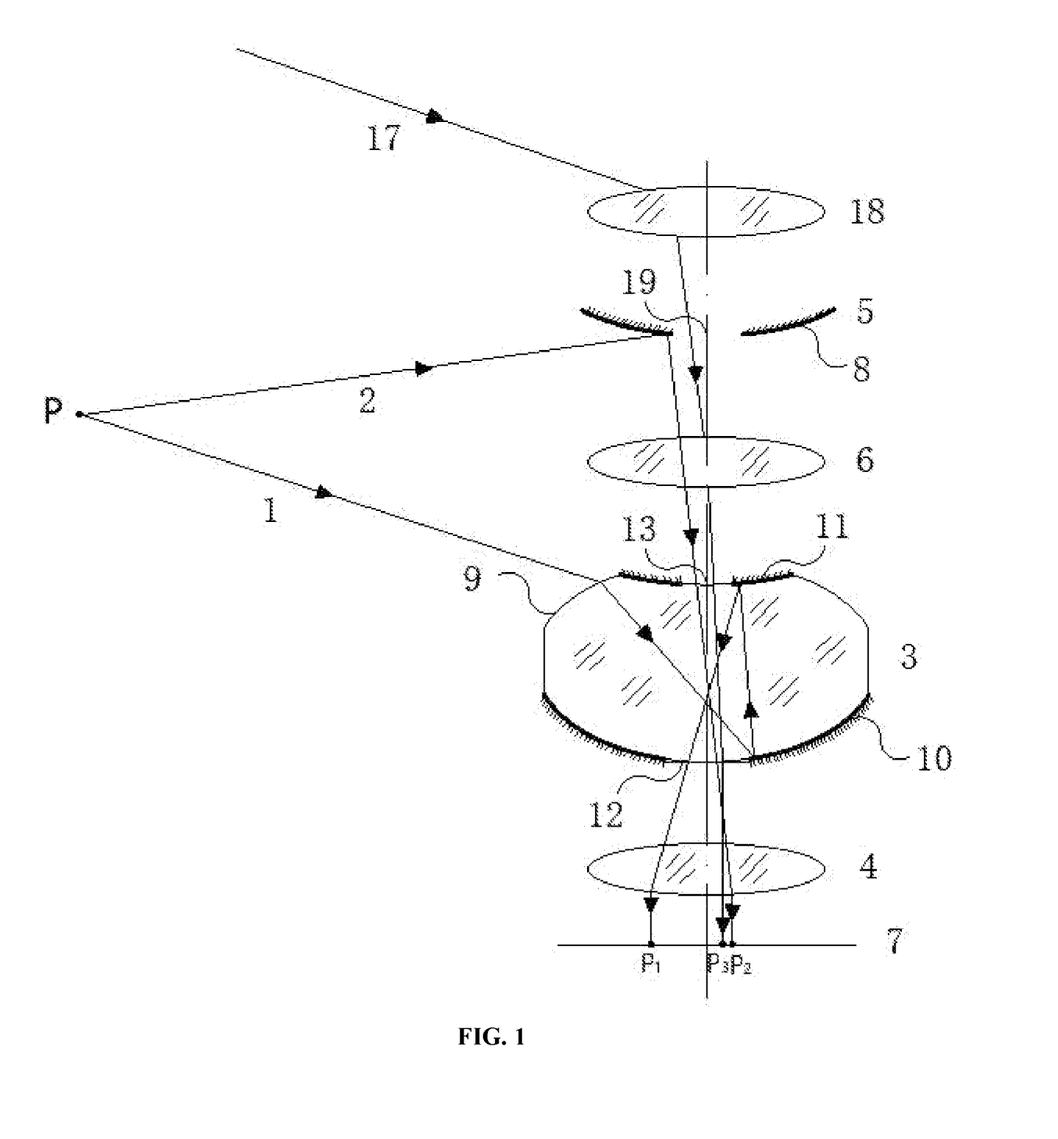
FIG. 1 is a schematic diagram of a hyper-hemispherical panoramic stereo imaging device.

As shown in FIG. 1, in the embodiment, the non-blind-area multi-view panoramic stereo imaging device includes a front lens assembly 18, an aspheric mirror 5, a middle lens assembly 6, a panoramic block 3, a rear lens assembly 4 and an image surface 7 which are longitudinally arranged along an optical axis.

The aspheric mirror 5 includes a central hole 19 and an annular reflecting surface 8 which are arranged in the middle. The aspheric mirror 5 may be an aspheric surface of any form, and can also be a free-form surface, so that a large-FOV light ray at the edge can be folded toward the direction of the image surface, and the light ray conveniently enters the panoramic block 3 and reaches the image surface for imaging. The machining difficulty and accuracy mainly depend on the aspheric coefficient order and tolerance requirements given in the optical design, and machining and manufacturing can be performed by single-point diamond turning or molding.

The structure of the panoramic block 3 is more complex than that of a general lens. The panoramic block 3 includes a plurality of transmission surfaces and two reflecting surfaces. The panoramic block 3 is formed by plating anti-reflection films and reflection films on different surfaces of the panoramic block lens. The panoramic block 3 includes a front central circular transmission surface 13, a front reflecting surface 11, a front transmission surface 9, a rear reflecting surface 10 and a rear transmission surface 12. The front central circular transmission surface 13 is located at the front central position of the panoramic block 3, and the rear transmission surface 12 is located at the rear central position of the panoramic block 3. The front reflecting surface 11, the front transmission surface 9 and the rear reflecting surface 10 are all annular surfaces. The inner edge of the front reflecting surface 11 is connected with the edge of the front central transmission surface 13. The edge of the front transmission surface 9 is respectively connected with the outer edge of the front reflecting surface 11 and the outer edge of the rear reflecting surface 10. The inner edge of the rear reflecting surface 10 is connected with the edge of the rear transmission surface 12.

The front reflecting surface 11 in the panoramic block 3 reflects a light path toward the image surface, and the rear reflecting surface 10 reflects the light path away from the image surface, so that the large-FOV light ray is reflected by the two reflecting surfaces of the panoramic block 3, exits from the panoramic block 3 at a small angle, enters the rear lens assembly 4, and is imaged on the image surface 7.

The front transmission surface 9, the front reflecting surface 11 and the front central transmission surface 13 are located on the front surface of the panoramic block 3. The curvature radius of the front central circular transmission surface 13 is the same as that of the front reflecting surface 11, and is different from that of front transmission surface 9. The rear reflecting surface 10 and the rear transmission surface 12 are located on the rear surface of the panoramic block 3. The curvature radii of the rear reflecting surface 10 and the rear transmission surface 12 are the same. The apertures of the reflecting surfaces and transmission surfaces are strictly limited. In the process of software design, the light path direction of the light ray needs to be controlled on these surfaces to avoid light disorder.

The object point P transmits two light rays. After being reflected by the annular reflecting surface 8 of the aspheric mirror 5, the light ray 2 passes through the middle lens assembly 6, the front central circular transmission surface 13 of the panoramic block 3, the rear transmitting surface 12 and the rear lens assembly 4 in turn, and then reaches the image surface 4 to be imaged as a point P1. The light ray 1 enters the panoramic block 3 from the front transmission surface 9 of the panoramic block, is reflected by the rear reflecting surface 10 and the front reflecting surface 11 of the panoramic block 3, exits from the rear transmission surface 12, enters the rear lens assembly 4, and finally reaches the image surface 7 to be imaged as a point P2.

The light ray 1 and the light ray 2 are in two light paths, and are the same in spectral range but the same or different in fields.

The spectral range, FOV range, size and other parameters of the whole optical imaging system are not limited by specific requirements, and appropriate adjustment and design can be made according to different application scenarios. The present disclosure provides design ideas for realizing panoramic stereo imaging devices.

The imaging device includes three light path channels. The first light path channel is configured to image a lateral field by using the panoramic block 3, and an image point P1 is located in an external annular area 15 of a detection image surface. The second light path channel is configured to reflect light by the aspheric mirror 5 and then image the lateral field by the front central circular transmission surface 13 of the panoramic block 3, and an image point P2 is located in an internal annular area 14 of a detection image surface. The third light path channel is configured to use the front lens assembly 18 or the plane mirror 21 to fold the light ray 17. The light ray passes through the central hole 19 of the coaxially placed aspheric mirror 5 and the front central circular transmission surface 13 of the panoramic block 3 in turn, and finally reaches a central circular area 16 for imaging. The external annular area 15 of a detection image surface, the internal annular area 14 of a detection image surface and the central circular area 16 do not interfere with one another, so that non-blind-area large-FOV stereo imaging is realized to obtain hyper-hemispherical FOV information. Due to different positions of the image points P1 and P2 on the image surface, the spatial position of object point P can be solved.

Figure 2:
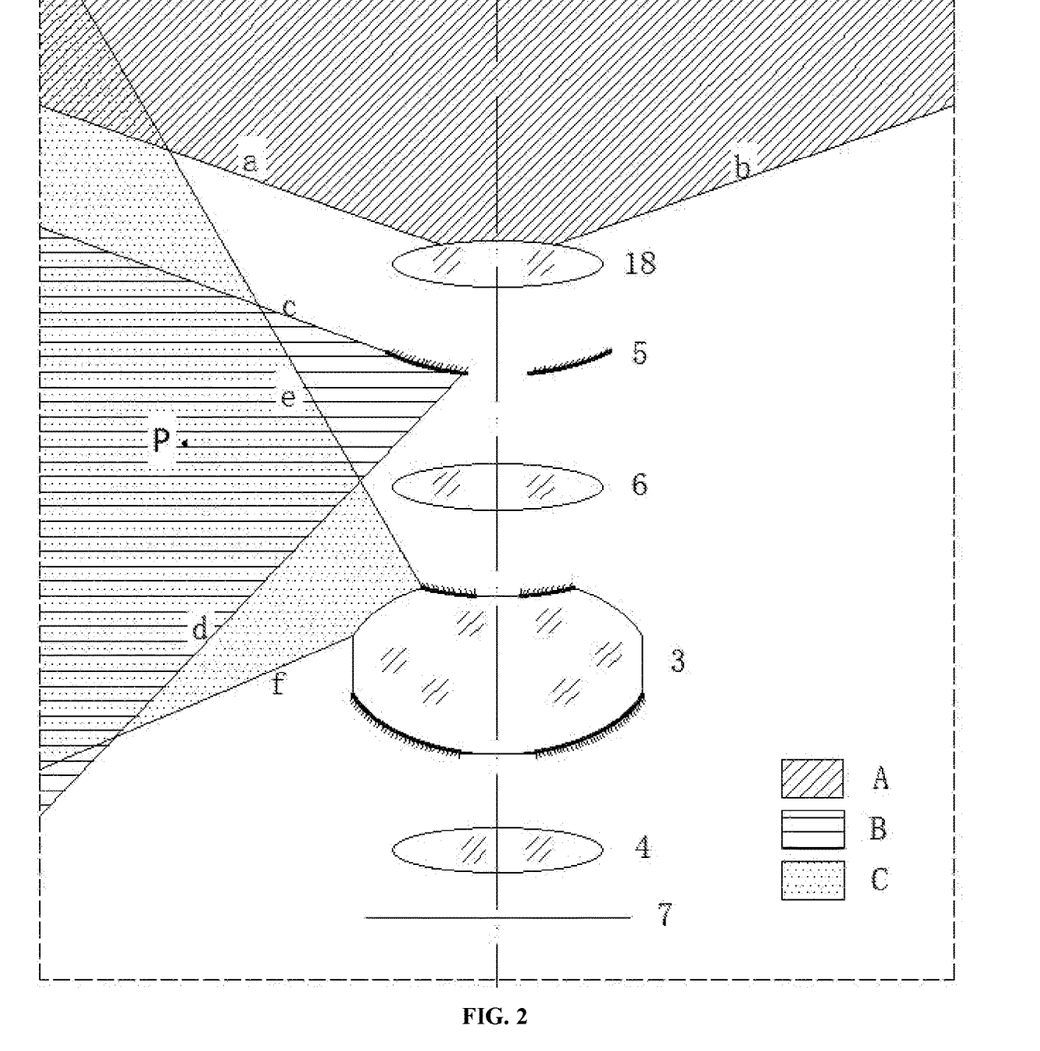
FIG. 2 is an FOV range schematic diagram of three channels in the hyper-hemispherical panoramic stereo imaging device.

As shown in FIG. 2, the area size of the image surface is shown. The external annular area 15 of a detection image surface represents the field light path where the light ray 1 is located. The internal annular area 14 of a detection image surface represents the field light path where the light ray 2 is located. The image heights of the two light paths are given according to the area size of the image surface, and the focal lengths of the two light paths are obtained from the image heights and the respective FOV ranges. In general, the focal lengths of the two light path systems are different. Wherein, the FOV range of the front lens assembly 18 is from the edge FOV a of the front lens assembly to the edge FOV b of the front lens assembly, the FOV range of the aspheric mirror 5 is from the edge FOV of the aspheric mirror 5 to the edge FOV d of the aspheric mirror 5, and the FOV range of the panoramic block 3 is from the edge FOV e of the panoramic block 3 to the edge FOV f of the panoramic block 3. The FOVs of the three channels can be superimposed and overlapped with one another, and three-channel ultra-wide-angle accurate measurement and shooting are realized. As shown in FIG. 2, A is the channel FOV range of the front lens assembly 18, B is the channel FOV range of the aspheric mirror 5, and C is the channel FOV range of the panoramic block 3.

Embodiment II

Figure 3:
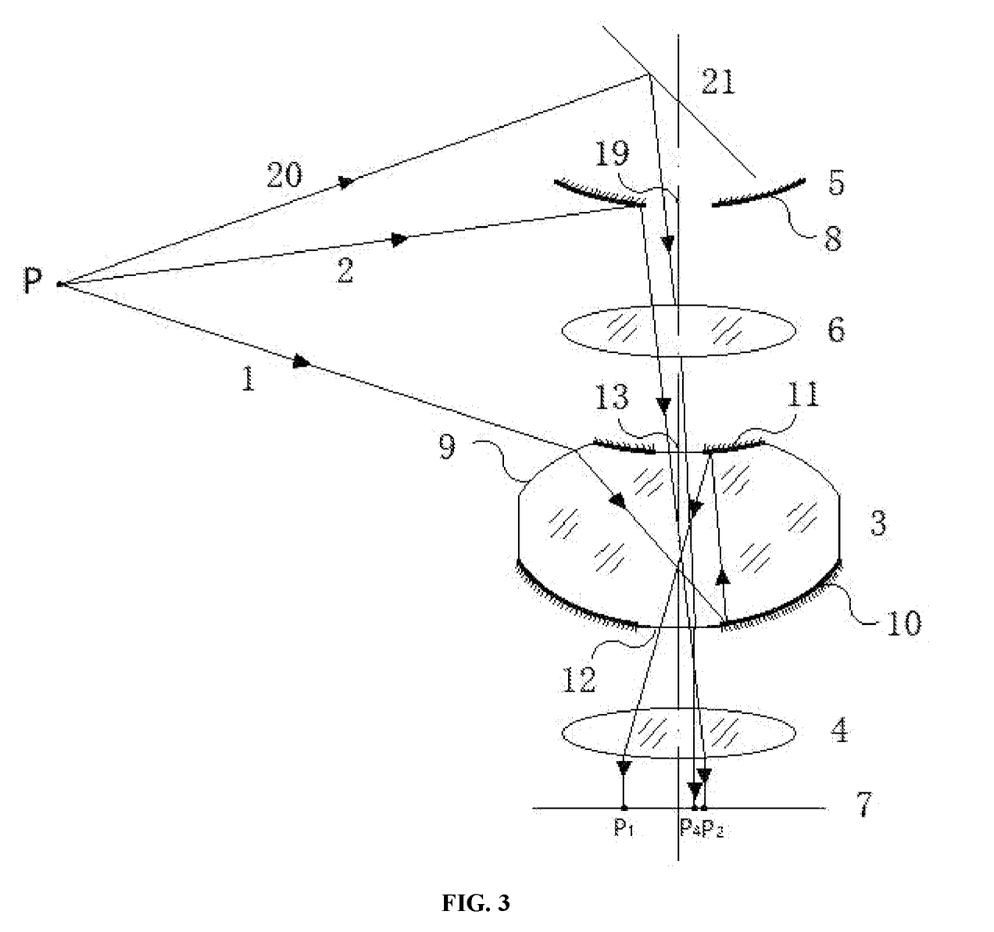
FIG. 3 is a schematic diagram of a three-view panoramic stereo imaging device.

As shown in FIG. 3 the front lens assembly 18 in the first embodiment is replaced by a plane mirror 21, and other structures are the same.

The plane mirror can be used for scanning imaging to focus and range independent FOV, so that three-dimensional multi-view depth information is obtained. The light rays 1, 2 and 20 respectively exit from the object point P at different angles. The light ray 1 passes through the front transmission surface 9 of the panoramic block 3 to enter the panoramic block 3, then passes through the rear reflecting surface 10, the front reflecting surface 11, the rear transmission surface 12 and the rear lens assembly 4 of the panoramic block 3 in turn, and finally is imaged on the image surface 7 to become a first image point P1. The light ray 2 passes through the middle lens assembly 6 after being reflected by the annular reflecting surface 8 of the aspheric mirror 5, then passes through the front central circular transmission surface 13, the rear transmission surface 12 and the rear lens assembly 4 of the panoramic block 3 in turn, and finally is imaged on the image surface 7 to become a second image point P2. The light ray 20 passes through the middle lens assembly 6 after being reflected by the plane mirror 21, then passes through the front central circular transmission surface 13, the rear transmission surface 12 and the rear lens assembly 12 of the panoramic block 3 in turn, and finally is imaged on the image surface 7 to become a fourth image point P4, so that three-view panoramic stereo imaging is realized, the stereo imaging accuracy is improved.

Figure 4:
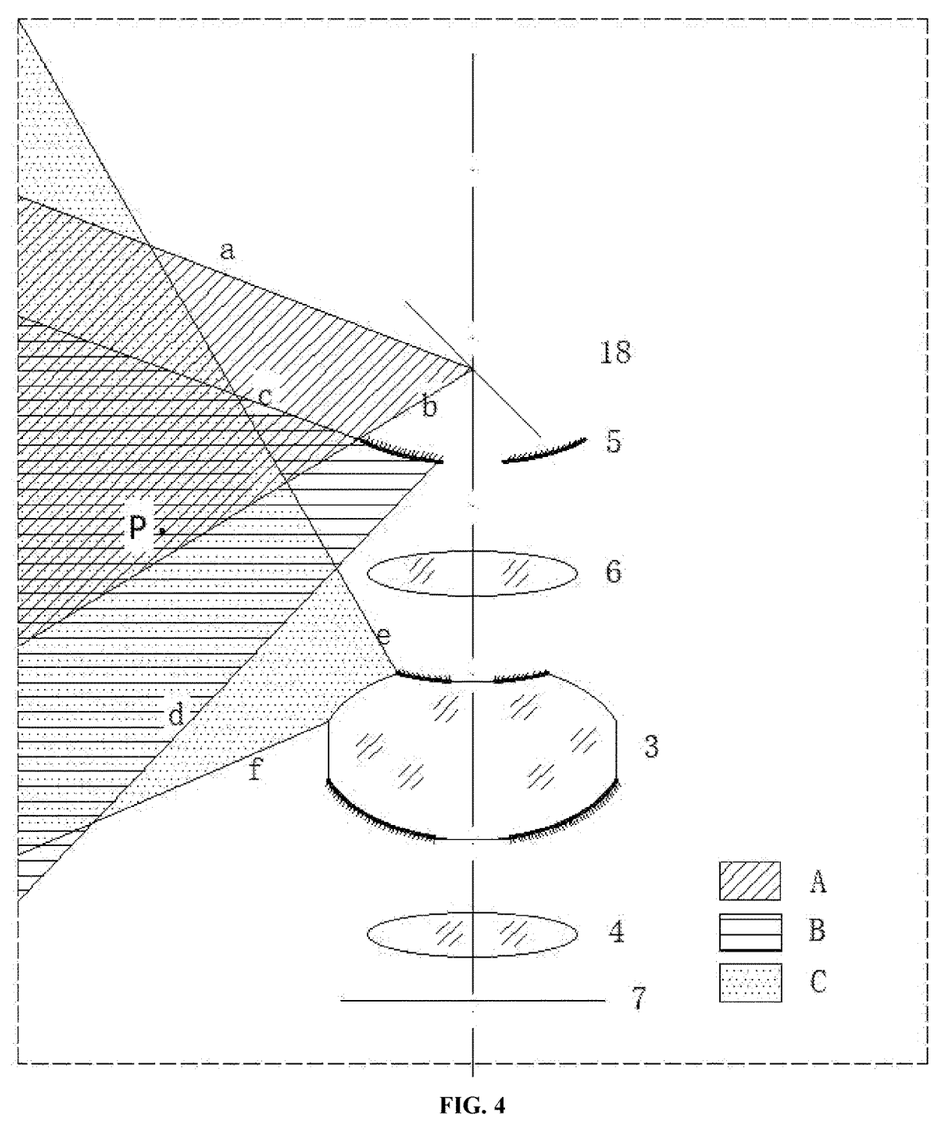
FIG. 4 is an FOV range schematic diagram of three channels in the three-view panoramic stereo imaging device.

As shown in FIG. 4, FIG. 4 an FOV range schematic diagram of three channels in the imaging device. The FOV range of the plane mirror 21, the channel FOV of the aspheric mirror 5, and the FOV range of the panoramic block 3 are overlapped with one another, so that three-view panoramic stereo imaging can be realized.

Figure 5:
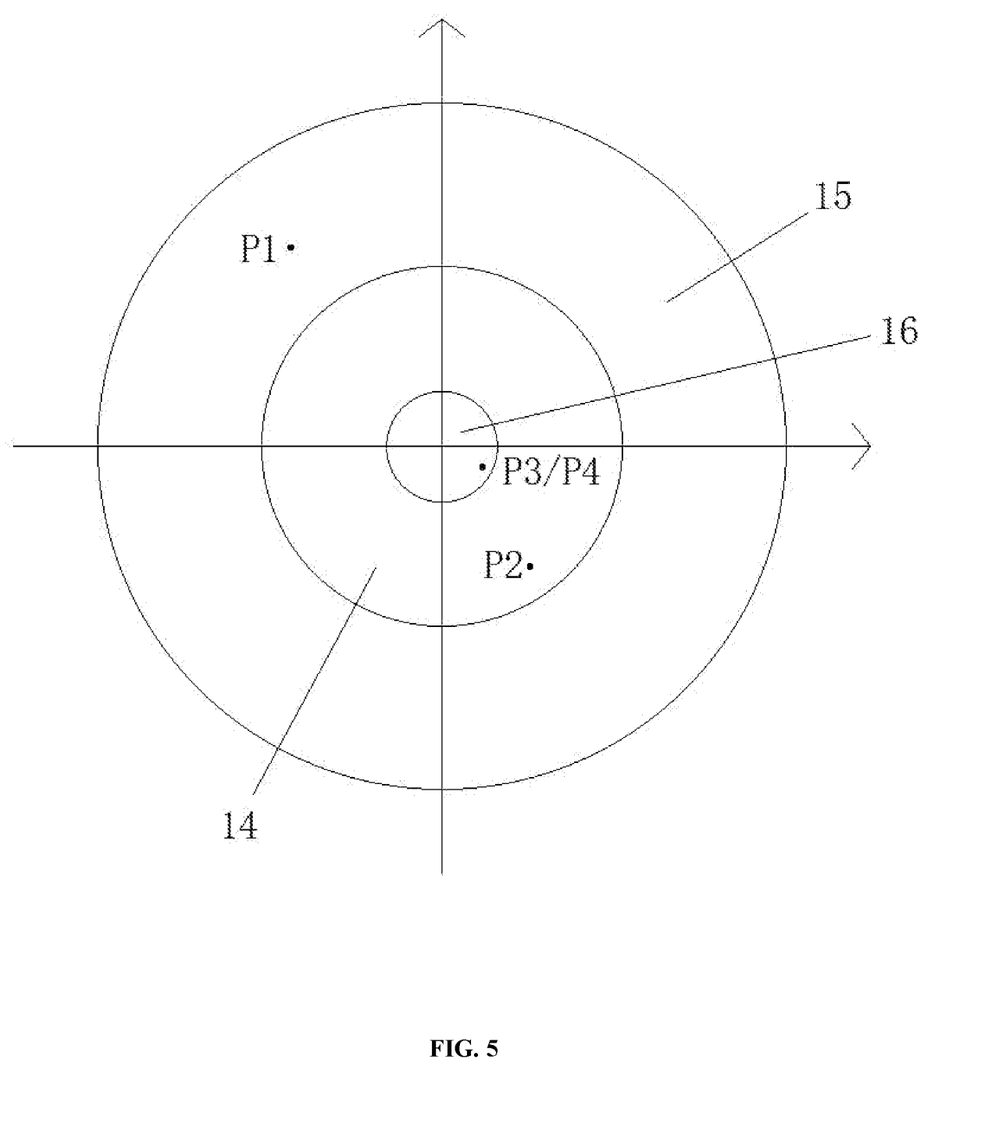
FIG. 5 is a schematic diagram of an imaging area of three channels on a detection image surface.

As shown in FIG. 5, FIG. 5 is a schematic diagram of an imaging area of three channels on a detection image surface. The first image point P1 is in the external annular area 15, and the second image point P2 is in the internal annular area 14. In the first embodiment, the third image point P3 is the object point of the channel of the front lens assembly 18. In the second embodiment, the fourth image point P4 is the object point where the channel of the plane mirror 21 is located. Both the third image point P3 and the fourth image point P4 are in the central circular area 16.

All lens glass materials in the present disclosure are not limited, and the surface type is not limited. The structure, material, surface type and the like can be adjusted according to the required design index to meet the target requirements.

The imaging device has a large application scene in the fields of video conferences, monitoring systems, machine vision and the like. A non-blind-area large-FOV panoramic stereo imaging system is realized by adding a central FOV light path above the aspheric mirror 5 to make up the blind area.

All embodiments in this specification are described in a progressive manner. Each embodiment focuses on differences from other embodiments. For the part that is the same or similar between different embodiments, reference may be made between the embodiments.

Several examples are used for illustration of the principles and implementation methods of the present disclosure. The description of the embodiments is used to help illustrate the method and the core principles of the present disclosure; and meanwhile, those skilled in the art can make various modifications in terms of specific embodiments and scope of application in accordance with the teachings of the present disclosure. In conclusion, the content of this specification shall not be construed as a limitation to the present disclosure.

What is claimed is:

1. A non-blind-area multi-view panoramic stereo imaging device, comprising: a front lens assembly (18), an aspheric mirror (5), a middle lens assembly (6), a panoramic block (3), a rear lens assembly (4) and an image surface (7) which are longitudinally arranged along an optical axis;

the aspheric mirror (5) comprises a central hole (19) and an annular reflecting surface (8) which are arranged in the middle;

the panoramic block (3) comprises a front central circular transmission surface (13), a front reflecting surface (11), a front transmission surface (9), a rear reflecting surface (10) and a rear transmission surface (12); the front central circular transmission surface (13) is located at the front central position of the panoramic block (3), and the rear transmission surface (12) is located at the rear central position of the panoramic block (3); the front reflecting surface (11), the front transmission surface (9) and the rear reflecting surface (10) are all annular surfaces; the inner edge of the front reflecting surface (11) is connected with the edge of the front central transmission surface (13), the edge of the front transmission surface (9) is respectively connected with the outer edge of the front reflecting surface (11) and the outer edge of the rear reflecting surface (10), and the inner edge of the rear reflecting surface (10) is connected with the edge of the rear transmission surface (12);

the front reflecting surface (11) in the panoramic block (3) reflects a light path toward the image surface, and the rear reflecting surface (10) reflects the light path away from the image surface, so that a large-FOV (Large-Field-Of-View) light ray is reflected by the two reflecting surfaces of the panoramic block (3), exits from the panoramic block (3) at a small angle, enters the rear lens assembly (4), and is imaged on the image surface (7); and the curvature radius of the front central circular transmission surface (13) is the same as that of the front reflecting surface (11), and is different from that of the front transmission surface (9); and the curvature radii of the rear reflecting surface (10) and the rear transmission surface (12) are the same;

wherein the imaging device comprises three light path channels, the first light path channel is configured to image a lateral field by using the panoramic block (3), and an image point P1 is located in an external annular area (15) of a detection image surface; the second light path channel is configured to reflect light by the aspheric mirror (5) and then image the lateral field by the front central circular transmission surface (13) of the panoramic block (3), and an image point P2 is located in an internal annular area (14) of a detection image surface; the third light path channel is configured to use the front lens assembly (18) to fold the light path; the light ray passes through the central hole (19) of the coaxially placed aspheric mirror (5) and the front central circular transmission surface (13) of the panoramic block (3) in turn, and finally reaches a central circular area (16) for imaging; the external annular area (15) of a detection image surface, the internal annular area (14) of a detection image surface and the central circular area (16) do not interfere with one another, so that non-blind-area large-FOV stereo imaging is realized;

wherein the third light path channel is configured to use the front lens assembly (18) to fold a light ray (17); wherein the light rays in the first light path channel and the second light path channel are emitted from a same object point, and the light ray (17) is from a different object point.

2. The non-blind-area multi-view panoramic stereo imaging device according to claim 1, wherein the curved surface of the aspheric mirror (5) is a free-form surface, so that the edge can be folded in a large FOV, and the light ray conveniently enters the imaging device and reaches the image surface (7) for imaging.

* * * * *